US006826133B2

(12) United States Patent
Ichimura et al.

(10) Patent No.: US 6,826,133 B2
(45) Date of Patent: Nov. 30, 2004

(54) OPTIMIZING A DISTANCE BETWEEN LENSES OF A TWO OBJECTIVE LENS FOR MINIMIZING WAVEFRONT ABERRATION AND OFFSETTING FOCUS CONTROL

(75) Inventors: Isao Ichimura, Tokyo (JP); Tatsuya Narahara, Kanagawa (JP); Kiyoshi Osato, Chiba (JP)

(73) Assignee: Sony Corporation, Tokyo (JP)

( * ) Notice: Subject to any disclaimer, the term of this patent is extended or adjusted under 35 U.S.C. 154(b) by 12 days.

(21) Appl. No.: 09/330,894

(22) Filed: Jun. 11, 1999

(65) Prior Publication Data

US 2003/0147332 A1 Aug. 7, 2003

(30) Foreign Application Priority Data

Jun. 19, 1998 (JP) .......................................... P10-173704

(51) Int. Cl.[7] .................................................. G11B 7/85
(52) U.S. Cl. .............................. 369/44.27; 369/53.23; 369/53.28; 369/112.01; 369/112.04
(58) Field of Search .......................... 369/44.27, 53.23, 369/53.28, 112.01, 112.24, 44.14, 44.23, 14, 44.26, 112.23, 112.27, 13.33, 275.3, 13.35, 44.24, 47.3, 44.13; 264/1.1, 2.7, 259, 267; 359/819, 717, 708, 719, 754, 794, 654; 356/345, 360

(56) References Cited

U.S. PATENT DOCUMENTS

| 4,135,207 A | * | 1/1979 | Greve et al. .............. 369/44.24 |
| 4,352,981 A | * | 10/1982 | Sugiyama et al. ....... 369/44.13 |
| 4,730,294 A | * | 3/1988 | Funada ................... 369/124.11 |
| 5,125,750 A | * | 6/1992 | Corle et al. ................. 359/356 |
| 5,646,932 A | * | 7/1997 | Kuribayashi et al. ..... 369/275.3 |
| 5,689,480 A | * | 11/1997 | Kino ...................... 369/112.23 |
| 5,828,453 A | * | 10/1998 | Yamamoto et al. ......... 356/515 |
| 6,005,834 A | * | 12/1999 | Maeda et al. .......... 369/112.24 |
| 6,075,656 A | * | 6/2000 | Bietry et al. ................ 359/708 |
| 6,097,688 A | * | 8/2000 | Ichimura et al. ....... 369/112.24 |
| 6,141,305 A | * | 10/2000 | Tsutsui .................... 369/44.32 |
| 6,270,696 B1 | * | 8/2001 | Jain et al. .............. 360/114.01 |
| 6,366,541 B1 | * | 4/2002 | Ohnuki et al. ........... 369/13.35 |

FOREIGN PATENT DOCUMENTS

| JP | 9-251645 | 9/1997 | ............ G11B/7/09 |
| JP | 10-188310 | 7/1998 | ............ G11B/7/09 |
| JP | 10-283644 | 10/1998 | ............ G11B/7/09 |

* cited by examiner

Primary Examiner—William Korzuch
Assistant Examiner—Kim-Kwok Chu
(74) Attorney, Agent, or Firm—Oblon, Spivak, McClelland, Maier & Neustadt, P.C.

(57) ABSTRACT

Disclosed are an optical information recording/reproducing apparatus and an optical information recording/reproducing method for simultaneously optimizing a distance between lenses constituting a two-objective lens and an offset in focus control. The apparatus includes a first electromagnetic actuator and a second electromagnetic actuator for cyclically moving a first lens and a second lens in the direction of the optical axis thereof; and a position control circuit for performing, upon focusing operation, the positional adjustment of the first lens and the second lens after start-up of focus control, on the basis of reproducing signals obtained from an optical disk at both ends of the cyclic movement of the first and second lenses by the first and second electromagnetic actuators.

25 Claims, 6 Drawing Sheets

OPTIMIZING A DISTANCE BETWEEN LENSES OF A TWO OBJECTIVE LENS FOR MINIMIZING WAVEFRONT ABERRATION AND OFFSETTING FOCUS CONTROL

BACKGROUND OF THE INVENTION

The present invention relates to an optical information recording/reproducing apparatus and an optical information recording/reproducing method for recording or reproducing optical information data on or from an optical recording medium by using a two-group objective lens having an increased numerical aperture.

In an apparatus for recording or reproducing optical information on or from an optical recording medium, a spot size "d" on the recording medium is expressed by the following equation:

$$d = \lambda/NA \quad (1)$$

In this equation, $\lambda$ is the wavelength of a light beam and NA is a numerical aperture of an objective lens.

As is apparent from the equation (1), the shorter the wavelength $\lambda$ of a light beam emitted from a light source becomes and/or the larger the numerical aperture NA of an objective lens becomes, the smaller the spot side "d" becomes. The reduction of the spot size "d" enables high density recording of optical information.

It is known that the use of an aspherical two-group objective lens is effective to make large the numerical aperture of an objective lens which is one of the above factors to reduce the spot size "d". Japanese Patent Laid-open No. Hei 9-251645 (Japanese Patent Application No. Hei 8-58870) by the present top inventor and the present applicant discloses an apparatus and a method for recording or reproducing optical information on or from a recording medium using a two-group objective lens, characterized by suppressing occurrence of spherical aberration.

In the case of using such a two-group objective lens, to obtain the best reproducing signal from a recording medium, it is required to optimize a distance between lenses constituting the two-group objective lens for minimizing wavefront aberration. Japanese Patent Application No. Hei 8-340903 made by the present first inventor and the present applicant discloses an apparatus and a method for recording/reproducing optical information on or from an optical disk. In this document, an optical disk drive using an optical head having a two-group objective lens is configured such that lenses constituting the two-group objective lens are integrally moved for focus servo operation and then the tail spherical lens of the two-group objective lens is independently moved in the direction of the optical axis to minimize wavefront aberration.

The R.M.S (route mean square) value of the wave front aberration should be preferably less than $\lambda/14$.

A focal depth (fd) defined by NA and $\lambda$ is expressed by the following equation:

$$fd = \lambda/NA^2 \quad (2)$$

As is apparent from the equation (2), in the case of using an objective lens with a high numerical aperture, the focal depth fd is significantly reduced. For example, the focal depth fd of a two-group objective lens having a numerical aperture NA of 0.85 is reduced to about half that of an objective lens (numerical aperture NA: 0.6) of an optical disk drive used for a DVD (Digital Video Disk)-RAM (Random Access Memory).

Accordingly, in the case of using an objective lens with a high numerical aperture, more accurate focus control is required to be performed sufficiently to follow a change in environmental temperature, a change with elapsed time, and the like. Japanese Patent Application No. Hei 9-84090 made by the present top inventor and the present applicant discloses a focus control device and a method thereof, and an optical disk drive using an optical head having a two-group objective lens with a high numerical aperture, in which focus control is accurately performed by optimizing the servo offset in focus servo, to thereby obtain the best reproducing signal from an optical disk.

Since the distance between lenses of a two-group objective lens and the servo offset in focus servo are both optimized on the basis of the same reproducing signal from a recording medium, it is required to establish a method capable of simultaneously optimizing both the above distance between lenses and servo offset. Also it is required to optimize the position of each lens before recording is started. Further, in the case of an unrecorded medium, the above optimization must be performed using pre-formatted embossed pits or the like.

The above-described related art methods, however, have problems. Namely, although the distance between lenses of a two-group objective lens and the servo offset in focus servo must be simultaneously optimized because they are optimized on the basis of the same reproducing signal from a recording medium, the above related art methods do not consider any method of simultaneously optimizing both the distance between lenses and servo offset.

In the case of a unrecorded medium, it may be considered to perform the above optimization using preformatted embossed pits or the like; however, since these pits are generally, discretely formed on a recording medium, there occurs an inconvenience that it is difficult to perform the above optimization using continuous reproducing signals.

SUMMARY OF THE INVENTION

An object of the present invention is to provide an optical information recording/reproducing apparatus and an optical information recording/reproducing method, which are capable of simultaneously optimizing a distance between lenses of a two-group objective lens and an offset value in focus control.

To achieve the above object, according to a first aspect of the present invention, there is provided an optical information recording/reproducing apparatus including an optical pickup for making a light beam emitted from a light source incident on a recording medium via a two-group objective lens so as to record or reproduce optical information on or from the recording medium, the two-group objective lens including a first lens disposed in the vicinity of the recording medium and a second lens disposed at a position facing to the recording medium with the first lens put therebetween, the apparatus including: a moving means for cyclically moving at least one of the first lens and the second lens constituting part of the optical pickup in the direction of the optical axis thereof; and a control means for performing, upon focusing operation, the positional adjustment of the first lens and the second lens after start-up of focus control, on the basis of reproducing signals obtained from the recording medium at one or more points of the cyclic movement of the at least one of the first lens and the second lens by the moving means.

According to a second aspect of the present invention, there is provided an optical information recording/reproducing apparatus including an optical pickup for making a light beam emitted from a light source incident on a recording medium via a two-group objective lens and at least a third lens so as to record or reproduce optical information on or from the recording medium, the two-group objective lens including a first lens disposed in the vicinity of the recording medium and a second lens disposed at a position facing to the recording medium with the first lens put therebetween and being configured such that a distance between the first lens and the second lens is fixed, the apparatus including: a first drive means for integrally driving the first lens and the second lens in the direction of the optical axis thereof, and a second drive means for driving the third lens in the direction of the optical axis thereof; a moving means for cyclically moving at least one of the first and second lenses and the third lens constituting part of the optical pickup in the direction of the optical axis thereof; and a control means for performing, upon focusing operation, the positional adjustment of the first and second lenses and the third lens after start-up of focus control, on the basis of reproducing signals obtained from the recording medium at one or more points of the cyclic movement of the at least one of the first and second lenses and the third lens by the moving means.

According to a third aspect of the present invention, there is provided an optical information recording/reproducing apparatus including an optical pickup for making a light beam emitted from a light source incident on a recording medium via a primary lens disposed in the vicinity of the recording medium and at least a secondary lens so as to record or reproduce optical information on or from the recording medium, the apparatus including: a first drive means for driving the primary lens in the direction of the optical axis thereof, and a second drive means for driving the secondary lens in the direction of the optical axis thereof; a moving means for cyclically moving at least one of the primary lens and the secondary lens constituting part of the optical pickup in the direction of the optical axis thereof; and a control means for performing, upon focusing operation, the positional adjustment of the primary lens and the secondary lens after start-up of focus control, on the basis of reproducing signals obtained from the recording medium at one or more points of the cyclic movement of the at least one of the primary lens and the secondary lens by the moving means.

According to a fourth aspect of the present invention, there is provided an optical information recording/reproducing method which is carried out by using an optical pickup for making a light beam emitted from a light source incident on a recording medium via a two-group objective lens so as to record or reproduce optical information on or from the recording medium, the two-group objective lens including a first lens disposed in the vicinity of the recording medium and a second lens disposed at a position facing to the recording medium with the first lens put therebetween, the method including the steps of: cyclically moving at least one of the first lens and the second lens constituting part of the optical pickup in the direction of the optical axis thereof; and performing, upon focusing operation, the positional adjustment of the first lens and the second lens after start-up of focus control, on the basis of reproducing signals obtained from the recording medium at one or more points of the cyclic movement of the at least one of the first lens and the second lens by the moving means.

The function of the optical information recording/reproducing apparatus and optical information recording/reproducing apparatus of the present invention will be described below.

First, an offset value in focus control and a distance between lenses of the two-group objective lens are set at pre-set values. Then, sine wave drive signals are applied to the moving means to cyclically, slightly move the first and second objective lenses in the direction of the optical axis.

A low band component of a change in amplitude, that is, an envelope component of a reproducing signal is detected, and is decided whether the amplitude obtained when the distance between the first and second lenses is minimized is larger or smaller than the amplitude obtained when the distance between the first and second lenses is maximized. If larger, the distance between the first and second lenses of the two-group objective lens is smaller than the optimum value. In this case, control is performed to increase the distance between the first and second lenses.

If the amplitude obtained when the first objective lens becomes closest to the recording medium is smaller than that obtained when the first objective lens becomes remotest from the recording medium, the distance between the first and second lenses of the two-group objective lens is larger than the optimum value. In this case, control is performed to decrease the distance between the first and second lenses.

Next, an operational mode of the optical disk drive is decided. If the drive receives a recording command, the distance between the lenses of the two-group objective lens is fixed and the application of the sine wave drive signals to the moving means for moving the first and second lenses is stopped, and recording is started.

Further, a high band component of the envelope component of a reproducing signal is detected, and it is decided whether the amplitude obtained when the first and second lenses become closest to the recording medium is larger or smaller than the amplitude obtained when the first and second lenses become remotest from the recording medium. If larger, the signal plane is remoter from the optical disk drive than the focus position is. In this case, control is performed to increase the focus bias value.

If the amplitude obtained when the first and second lenses become closest to the recording medium is smaller than the amplitude obtained when the first and second lenses become remotest from the recording medium, the signal plane is closer to the optical disk drive than the focus position is. In this case, control is performed to decrease the focus bias value.

Next, an operational mode of the optical disk drive is decided. If the drive receives a recording command, the focus bias value is fixed and the application of the sine wave drive signals to the moving means for moving the first and second lenses is stopped, and recording is started.

DETAILED DESCRIPTION OF THE PREFERRED EMBODIMENTS

Hereinafter, an optical disk drive using an aspherical two-group objective lens with a high numerical aperture as an embodiment of the present invention will be described with reference to the accompanying drawings.

Figure 1:
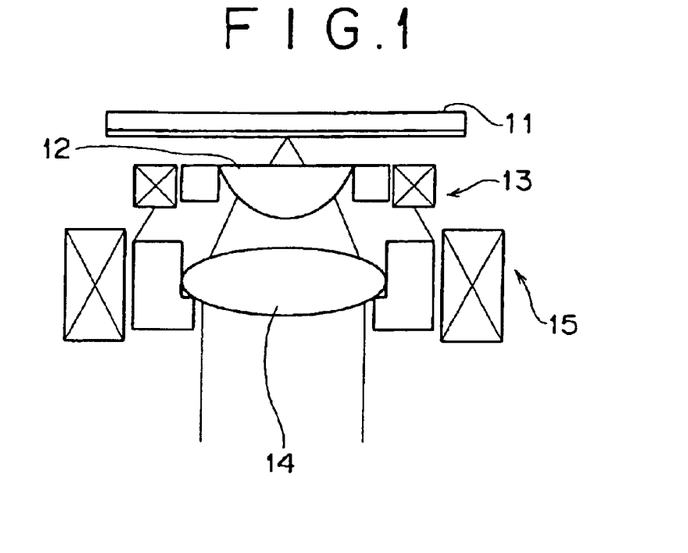
FIG. 1 is a diagram showing a configuration of an aspherical two-group objective lens for an optical system of an optical disk drive of an embodiment of the present invention.

FIG. 1 is a diagram showing a configuration of an aspherical two-group objective lens used for an optical system of an optical disk drive according to an embodiment of the present invention.

Referring to FIG. 1, a second lens 14 is mounted on a second electromagnetic actuator 15 movable in the direction of the optical axis. The numerical aperture of the second lens 14 is set at about 0.5. A first lens 12 is mounted on a first electromagnetic actuator 13 provided separately from the above-mentioned second electromagnetic actuator 15 in such a manner as to be positioned on the same optical axis as that for the second lens 14. The first lens 12 is controllable at an arbitrary position.

The first lens 12 is moved integrally with the second lens 14 in the track crossing direction to follow a tracking servo. A light beam emitted from a semiconductor laser light source, which is not shown, is converged on an optical disk 11 through the first and second objective lenses 12 and 14. At this time, the effective numerical aperture of the two-group objective lens becomes about 0.85. In general, the working distance of an objective lens with a high numerical aperture is smaller than that of an objective lens with a low numerical aperture of the conventional optical pickup. In this embodiment, the working distance of the two-group objective lens having the high numerical aperture is as small as about 100 μm.

In general, a skew tolerance which is a value allowing the disk skew of an optical disk drive is reduced with an increase in numerical aperture of an objective lens used for the optical disk drive. A wavefront aberration due to a disk skew in the X-direction is expressed by the following Seidel's polynomial:

$$W(x,y)=W_{22}x^2+W_{31}x(x^2+y^2)+W_{51}x(x^2+y^2)^2 \qquad (3)$$

In the above equation, $W_{22}$ designates astigmatism, $W_{31}$ is tertiary coma-aberration, and $W_{51}$ is quintic coma-aberration. Of these terms, the dominant tertiary coma-aberration $W_{31}$ is given by the following equation:

$$W_{31}=(n^2-1)n^2 \sin\theta \cos\theta/2(n^2-\sin^2\theta)^{2/5} \cdot tNA^3/\lambda \qquad (4)$$

From this equation, it is apparent that if a skew angle θ is 1° or less, the tertiary coma-aberration W31 is nearly proportional to both the cube of the numerical aperture NA and the thickness "t" of a disk substrate.

Accordingly, in the case of the optical disk drive in which the numerical aperture NA is increased up to 0.85 by using the aspherical two-group objective lens, for the purpose of ensuring a skew tolerance comparable to that for a DVD (Digital Video Disk), the substrate thickness "t" is required to be thinned to about 0.1 mm.

Figure 2:
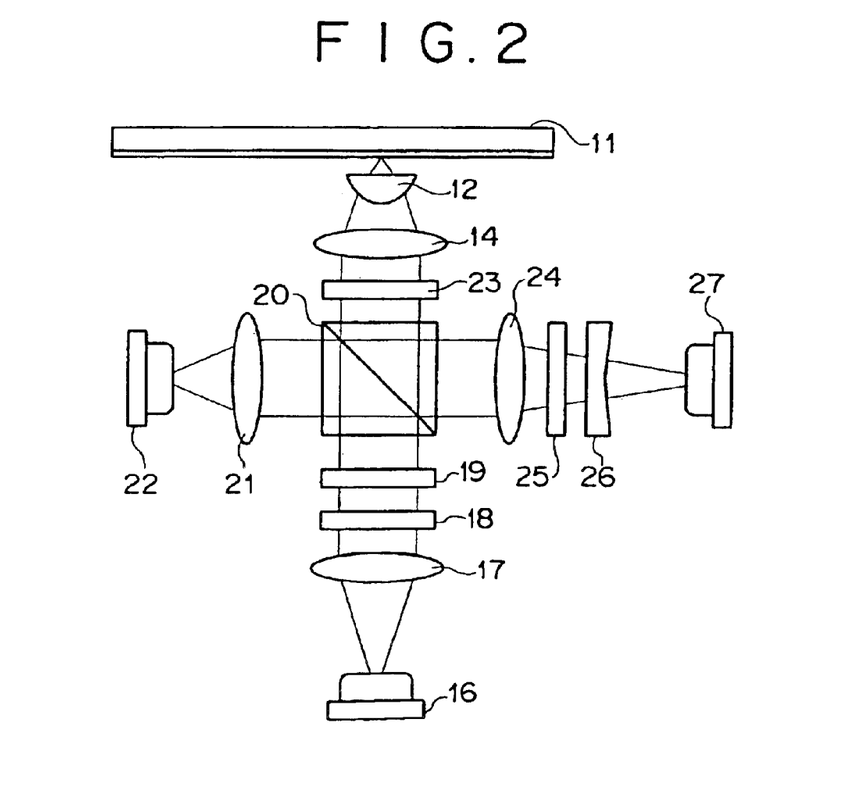
FIG. 2 is a diagram showing a configuration of an optical pickup for reproducing information from an optical disk according to an embodiment of the present invention.

FIG. 2 is a diagram showing a configuration of an optical pickup for reproducing information from an optical disk according to an embodiment of the present invention.

Referring to FIG. 2, a light beam emitted form a semiconductor laser 16 is collimated through a collimator lens 17, passing through a diffraction grating 18 for generation of a side spot, a half-wave plate 19, a beam splitter 20 and a quarter-wave plate 23, and is converged on the optical disk 11 through the second lens 14 and the first lens 12 of the two-group objective lens. Part of the light beam emitted from the semiconductor laser 16 is reflected from the beam splitter 20, being converged through a lens 21, and is led to a light receiving element 22 for detecting a light emission output. The light beam incident on the light receiving element 22 is used for control of a laser output onto the optical disk 11. In addition, the quantity of the light beam incident on the light receiving element 22 is adjusted by turning the half-wave plate 19.

The light beam reflected from the optical disk 11 is reflected from the beam splitter 20 to be led to a detection path. In this embodiment, a focus error signal is obtained by a spot size method, and a tracking error signal is obtained by a differential push-pull method. The light beam converged through a convex lens 24 undergoes optical path division by a hologram element 25 and a Foucault's prism 26, and is made incident on a light receiving element 27 for detecting an RF signal serving as a servo error signal, to be thus subjected to photoelectric conversion. As the light receiving element 27, a twelve-divided type light receiving element shown in FIG. 3 is used.

Figure 3:
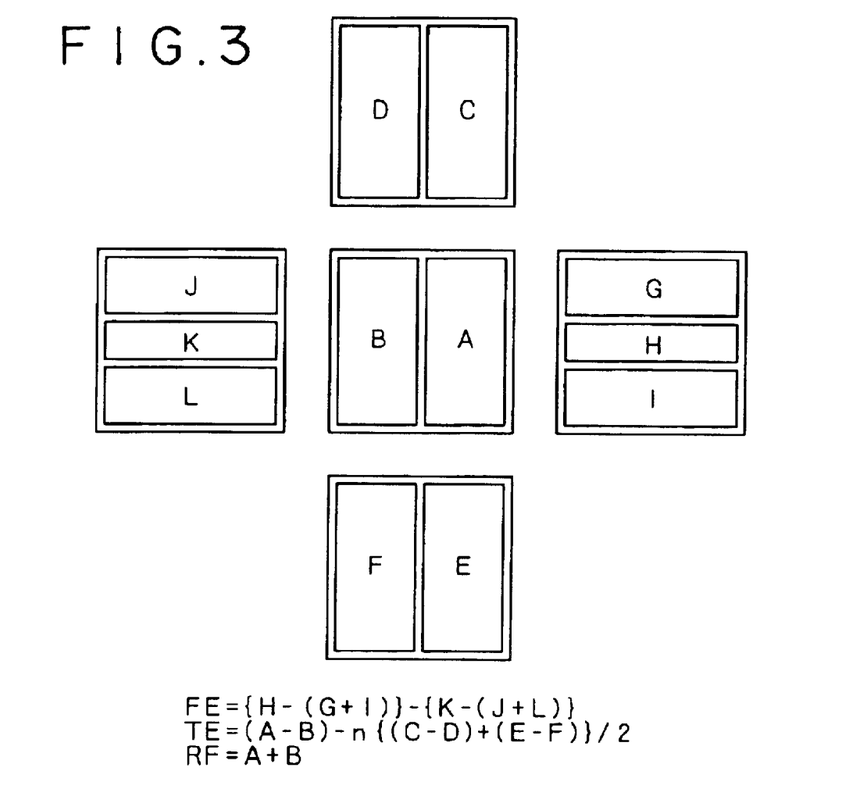
FIG. 3 is a diagram showing arrangement of twelve-divided light receiving elements according to an embodiment of the present invention.

FIG. 3 is a diagram showing arrangement of twelve pieces of components constituting the above twelve-divided type light receiving element 27 in this embodiment. As shown in FIG. 3, the light receiving element 27 has three pieces of two-divided light receiving portions, A and B, C and D, and E and F, and two pieces of three-divided light receiving portions, G, H and I, and J, K and L. In three pieces of the two-divided light receiving portions, the components A and B, C and D, and E and F are arranged in the track crossing direction or on the right and left sides of the track in such a manner as to be symmetric with respect to the tangential direction of the track, respectively; and in two pieces of the three-divided light receiving portions, the components G and J, H and K, and I and L are symmetrically arranged, respectively. A focus error signal FE is calculated on the basis of outputs from the components G to L of the light receiving element 27 shown in FIG. 3 by the following equation:

$$FE=\{H-(G+I)\}-\{K-(J+L)\} \qquad (5)$$

A tracking error signal TE is calculated on the basis of outputs from the components A to F of the light receiving element 27 shown in FIG. 3 by the following equation:

$$TE=(A-B)-n\{(C-D)+(E-F)\}/2 \qquad (6)$$

In this equation (6), symbol "n" designates a constant.

A reproducing RF signal is obtained by the sum of outputs from the components A and B of the light receiving element 27 shown in FIG. 3 as expressed by the following equation:

$$RF=A+B \qquad (7)$$

Figure 4:
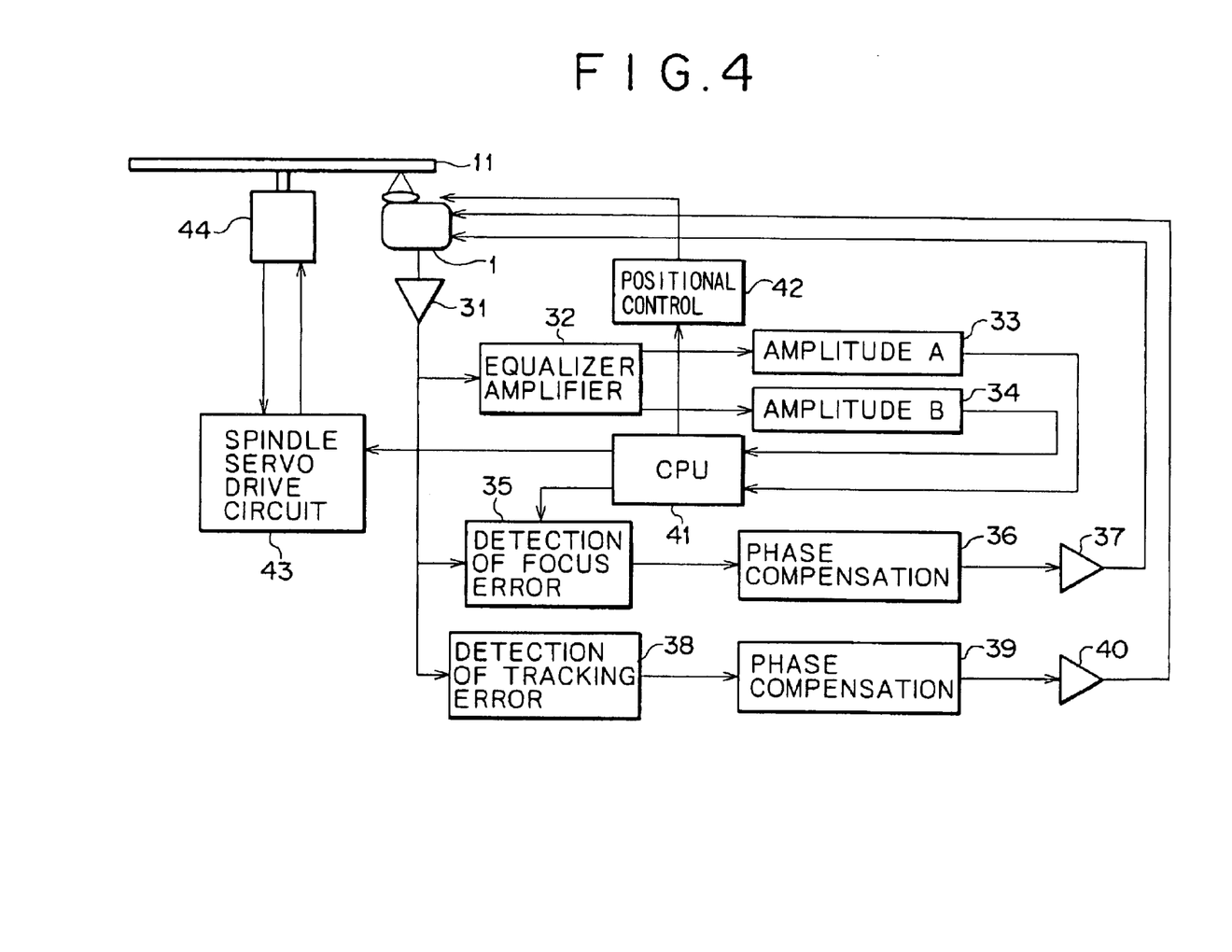
FIG. 4 is a diagram showing a circuit block of an optical disk drive according to an embodiment of the present invention.

FIG. 4 is a circuit block diagram showing a configuration of an optical disk drive according to an embodiment of the present invention.

Referring to FIG. 4, a reproducing RF signal having been read from an optical disk 11 by an optical system 1 is supplied to a head amplifier 31. The head amplifier 31 is adapted to amplify a reproducing signal or each output of a detecting element supplied from the optical pickup of the optical system 1 at a specific level required to be processed at the subsequent step.

The reproducing signal thus amplified passes through an equalizer amplifier 32 and is supplied to a signal processing system, which is not shown, and simultaneously it is supplied to an RF signal detection circuit (A) 33 and an RF signal detection circuit (B) 34 as a signal for adjustment of a distance between lenses of a two-group objective lens of the optical pickup and adjustment of an offset in focus control.

A CPU 41 is adapted to control operation of the entire optical disk drive. Specifically, the CPU 41 controls a spindle servo drive circuit 43 for driving a spindle motor 44, and particularly in this embodiment, the CPU 41 has a function for performing focus control of the optical system 1. The outputs from the RF signal detection circuit (A) 33 and the RF signal detection circuit (B) 34 are supplied to the CPU 41, being suitably processed, and are outputted as control signals for focus control. The procedure for performing focus control by the CPU 41 will be described later.

Part of the output from the head amplifier 31 is supplied to a focus error detection circuit 35 and a tracking error detection circuit 38. The focus error detection circuit 35 performs calculation for the input signal on the basis of the equation (5), and the tracking error detection circuit 38 performs calculation for the input signal on the basis of the equation (6). The outputs from both the circuits 35 and 38 are subjected to phase compensation by phase compensation circuits 36 and 39, being amplified into necessary amplitudes by amplifiers 37 and 40, and are fed back to the optical system 1, respectively. The distance between lenses constituting the two-group objective lens is controlled by a position control circuit 42, and an instruction signal from the position control circuit 42 is controlled by the CPU 41.

Upon focusing operation, after start-up of focus control, the above described optimization of the distance between the lenses of the two-group objective lens and adjustment of an offset between the focal point of a light beam and a signal recording plane of the optical disk 11 are simultaneously performed to obtain the best reproducing signal. For an optical disk drive in which information is recordable in the optical disk 11, the position of each lens must be optimized before recording is started. For a unrecorded optical disk medium, the above optimization of the distance between the lenses of the two-group objective lens and the adjustment of an offset in focus control are performed on the basis of reproducing signals from pit portions previously, discretely formed on the medium.

Figure 5:
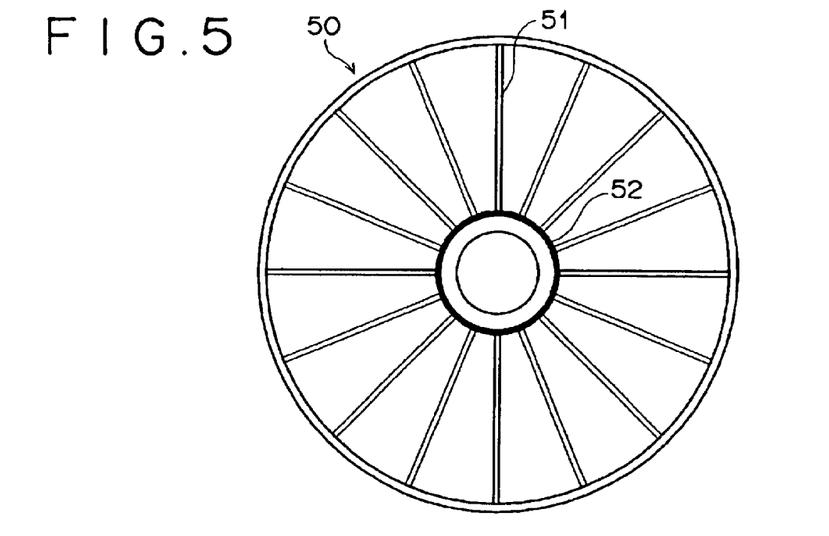
FIG. 5 is a diagram showing a disk pre-format according to an embodiment of the present invention.

FIG. 5 shows a pre-format of an optical disk in this embodiment.

As shown in FIG. 5, a pre-formatted recordable disk 50 has pit portions 51 on the outer peripheral side from the innermost peripheral lead-in 52. The pit portions 51 are composed of 16 pieces of radially extending sector marks or embossed pits spaced at equal intervals in the circumferential direction. When the disk is rotated at a rotational speed of 3600 rpm equivalent to a frequency of 60 Hz in a CAV (Constant Angular Velocity) mode, the appearance frequency fp of the pit portions 51 becomes 960 Hz.

Figure 6A:
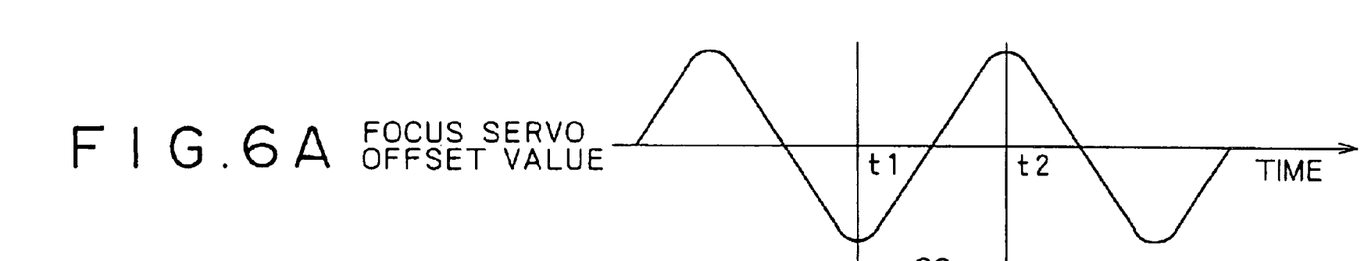
FIGS. 6A and 6B are diagrams showing an amplitude of a reproducing RF signal according to an embodiment of the present invention, wherein FIG. 6A designates a focus servo offset value, and FIG. 6B designates an amplitude of a reproducing signal.
Figure 6B:
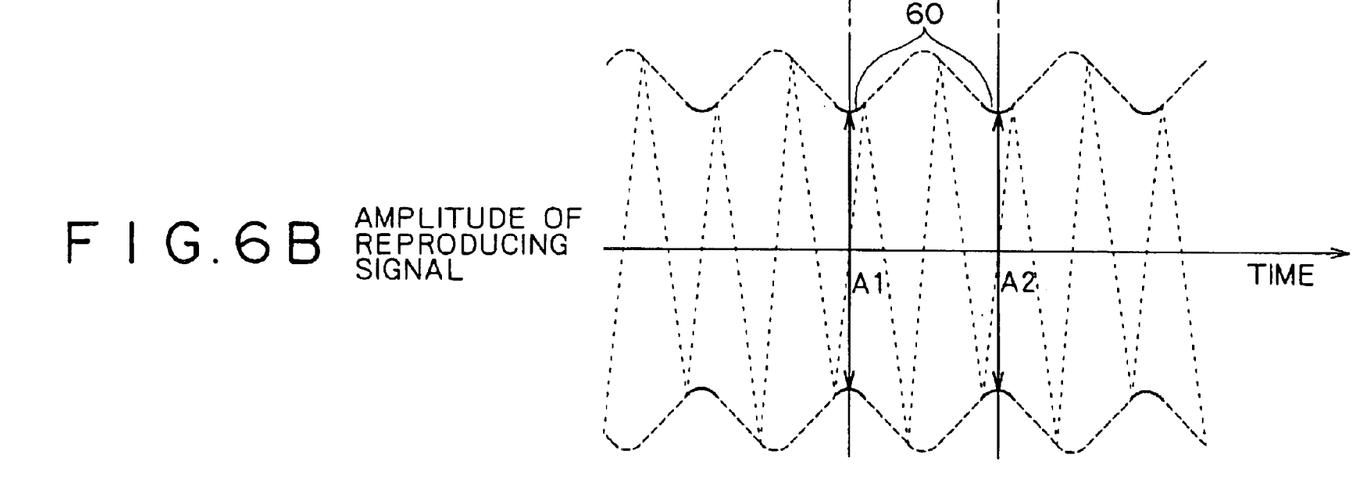

FIGS. 6A and 6B are diagrams showing a change in offset of focus servo and a change in amplitude of a reproducing RF signal in this embodiment, respectively.

To be more specific, FIG. 6B shows a change in amplitude of reproducing signals obtained from the pit portions 60 when the second electromagnetic actuator 15 mounting the second lens 14 of the two-group objective lens shown in FIG. 1 is moved in a sine wave mode (frequency: f2=fp/2) along the direction of the optical axis in a state in which focus servo and tracking servo are applied to the optical pickup. In the case where the reproducing signals are continuously present, if the offset in focus servo is optimized as shown in FIG. 6A, the focal point changes in such a manner as to be centered on a signal recording plane of the optical disk, and accordingly, when the displacement of the focal point is zero in FIG. 6A, that is, when the focal point is just on the signal recording plane of the optical disk, the amplitude of the reproducing signal should be maximized as shown by the peaks of the dotted line in FIG. 6B.

Further, at each of a point t1 where the second objective lens becomes closest to the optical disk and a point t2 where the second objective lens becomes remotest from the optical disk in FIG. 6A, the amplitude of the reproducing RF signal is minimized as shown in FIG. 6B. On the other hand, if amplitudes A1 and A2 at the points t1 and t2 which are both ends of the moving range of the second objective lens are different from each other, it is decided that the center value of the sine wave indicating a change in focus servo offset in FIG. 6A is deviated from the optimum value of the focus offset. The decision means that the focal point is present on the front side or the back side from the signal plane of the optical disk. That is to say, a relationship of A1<A2 or A1>A2 corresponds to the polarity (negative or positive) of an error signal.

Accordingly, the focus offset of the two-group objective lens can be adjusted to an optimum value by making use of the above relationship, that is, by adjusting the change in offset shown in FIG. 6A in such a manner that the amplitudes A1 and A2 shown in FIG. 6B become equal to each other. That is to say, by synchronizing the cyclic movement of the second electromagnetic actuator 15 with the appearance cycle of the pit portions 60 if reproducing RF signals are not continuously present, it is possible to perform, even for an unrecorded medium, such a control that the amplitudes A1 and A2 are always present as shown by the solid line in FIG. 6B. In this way, the present invention can be applied to an unrecorded optical medium in a state before recording is started.

The distance between the lenses of the two-group objective lens can be adjusted to an optimum value by the same manner as that used for the above-described optimization of the offset in focus control. When the first electromagnetic actuator 13 mounting the first lens 12 of the two-group objective lens shown in FIG. 1 is moved along the direction of the optical axis in such a sine wave mode (frequency: f1=fp/n, n: integer number) that the cycle of the sine wave is synchronized with the appearance cycle of the pit portions to thereby change the distance between the lenses of the two-group objective lens, the amplitude of a reproducing RF signal from the recording medium is maximized in a state in which the distance between the lenses of the two-group objective lens is optimized.

At this time, an error in focus control (defocus) occurs together with spherical aberration caused by a change in the distance between the lenses of the two-group objective lens, and since a change in amplitude of a reproducing signal due to defocus is larger than a change in amplitude of the signal due to spherical aberration, the reproducing signal is largely affected by the change in amplitude of the signal due to defocus unless focus control is performed to cancel the defocus, with a result that it is difficult to obtain the change in amplitude of the signal due to spherical aberration separately from the change in amplitude of the signal due to defocus. In other words, to cyclically change the distance between the lenses of the two-group objective lens, it is required to ensure a sufficient gain of focus servo, and to change the distance at a low frequency satisfying the following equation (8) in order to remove the above defocus, thereby separating the frequency band of a signal used for detection of the change in amplitude due to spherical aberration from the frequency band of a signal used for detection of the change in amplitude due to defocus.

$$f1 \ll f2 \tag{8}$$

In the case of realizing a high density optical disk drive, it is desirable to simultaneously perform both the above-described optimization of the offset in focus control and optimization of the distance between lenses of a two-group objective lens. For example, the electromagnetic actuators 13 and 15 are cyclically moved under a condition that f1 and f2 are set at 24 Hz and 480 Hz on the basis of the equation (8), respectively. In this case, the amplitude of each of reproducing signals from the pit portions is composed of amplitudes of a signal component of 24 Hz and a signal component of 480 Hz. In this embodiment, however, a signal component having passed through a low band filter (not shown) in the RF signal detection circuit (A) 33 is used for detection of a change in amplitude due to a change in the distance between the lenses of the two-group objective lens; and a signal component having passed through a high band filter (not shown) in the RF signal detection circuit (B) 34 is used for detection of a change in amplitude due to the offset in focus control. In addition, it is effective to perform the above-described optimization of the distance between the lenses of the two-group objective lens only upon reproducing a signal and to fix the lenses of the two-group objective lens at optimum positions, that is, stop the cyclic change in the distance between the lenses upon recording information.

Figure 7:
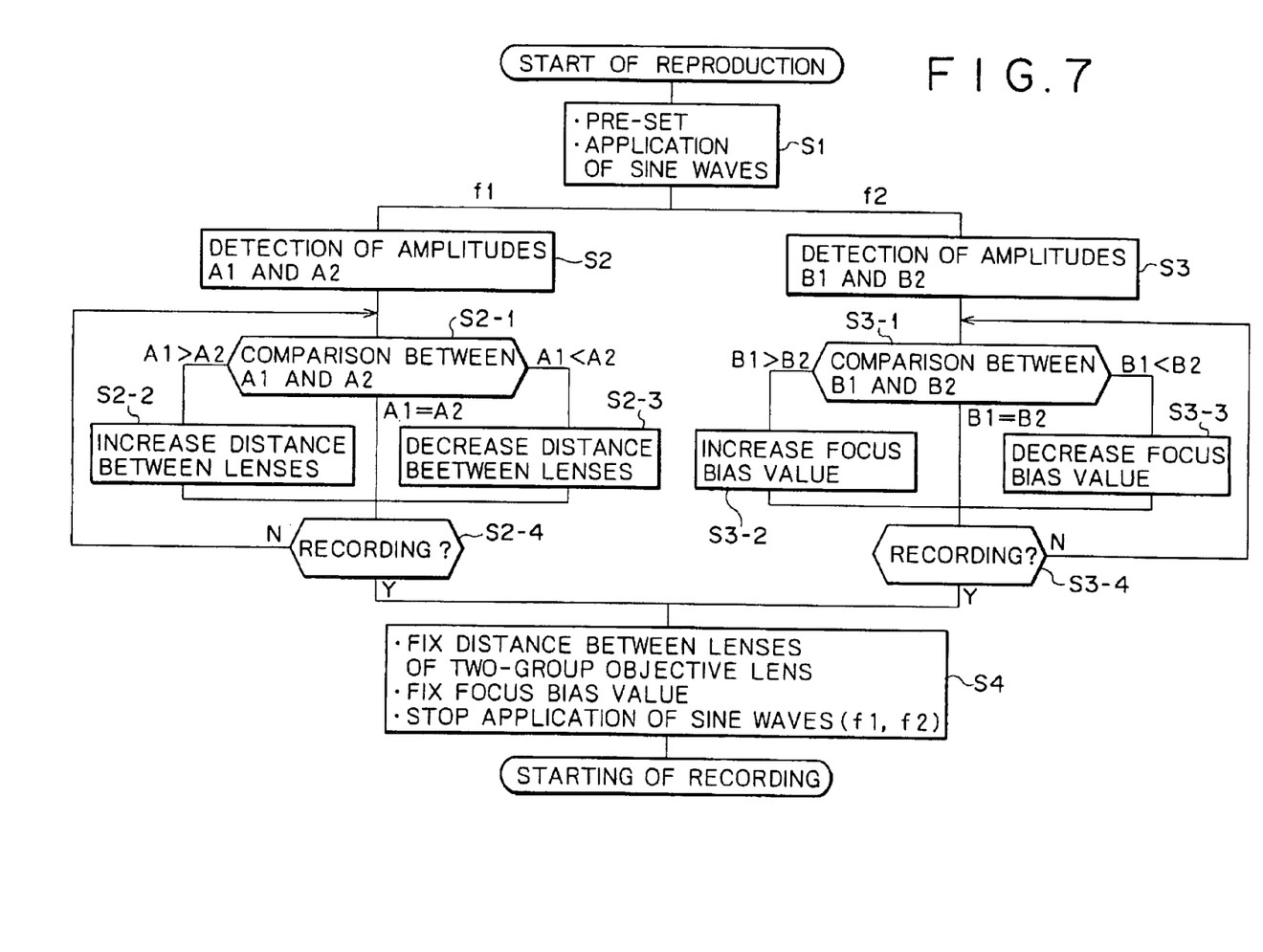
FIG. 7 is a flow chart showing a procedure for optimizing of focus control according to an embodiment of the present invention.

FIG. 7 is a flow chart showing a procedure of optimization of focus control in this embodiment.

Referring to FIG. 7, at Step S1, a focus control offset and a distance between the lenses of the two-group objective lens are pre-set, and the above-described sine wave drive signals are applied to the first and second electromagnetic actuator 13 and 15 to cyclically, slightly move the first and second objective lenses 12 and 14 in the direction of the optical axis. At Step S2, a change in each of amplitudes A1 and A2 of a reproducing RF signal having passed through the low band filter is detected, and at Step S3, a change in each of amplitudes B1 and B2 of a reproducing RF signal having passed through the high band filter is detected. As shown in FIG. 6, the amplitudes A1 and B1 are detected at the point t1 where the first and second objective lens become closest to the optical disk, and the amplitudes A2 and B2 are detected at the point t2 where the first and second objective lens become remotest from the optical disk. In other words, the amplitudes A1 and B1 and the amplitudes A2 and B2 are detected at the points t1 and t2 which are both the ends of the moving range of the first and second objective lenses to and from the optical disk, respectively.

At Step S2-1, as shown in FIG. 5, it is decided that A1>A2 or A1<A2. If A1>A2, the process goes on to Step S2-2, and if A1<A2, the process goes on to Step S2-3. At Step S2-2, control is made to widen the distance between the lenses of the two-group objective lens. This is because in this embodiment, the relationship of A1>A2 means that the distance between the lenses of the two-group objective lens is smaller than the optimum value.

At Step S2-4, the operational mode of the optical disk drive is decided. If the drive receives a recording command, the process goes on to Step S4, and if the drive receives a command indicating the normal reproducing mode, the process is returned to Step S2-1.

At Step S2-3, control is made to narrow the distance between the lenses of the two-group objective lens. This is because in this embodiment, the relationship of A1<A2 means that the distance between the lenses of the two-group objective lens is larger than the optimum value. If A1=A2 at Step S2-1, the process directly goes on to Step S2-4.

Similarly, at Step S2-4, the operational mode of the optical disk drive is decided. If the drive receives a recording command, the process goes on to Step S4, and if the drive receives a command indicating the normal reproducing mode, the process is returned to Step S2-1.

At Step S4, the distance between the lenses of the two-group objective lens is fixed, and the application of the sine wave drive signal to the first electromagnetic actuator 13 is stopped, to stop the movement of the first objective lens 12, thus starting recording.

At Step S3-1, similarly, it is decided that B1>B2 or B1<B2. If B1>B2, the process goes on to Step S3-2, and if B1<B2, the process goes on to Step S3-3. At Step S3-2, control is made to increase a focus bias value. This is because in this embodiment, the relationship of B1>B2 means that the signal plane is remoter from the drive than the focus position.

At Step S3-4, the operational mode of the optical disk drive is decided. If the drive receives a recording command, the process goes on to Step S4, and if the drive receives a command indicating the normal reproducing mode, the process is returned to Step S3-1.

At Step S3-3, control is made to decrease the focus bias value. This is because in this embodiment, the relationship of B1<B2 means that the signal plane is closer to the drive than the focus position. If B1=B2 at Step S3-1, the process directly goes on to Step S3-4.

Similarly, at Step S3-4, the operational mode of the optical disk drive is decided. If the drive receives a recording command, the process goes on to Step S4, and if the drive receives a command indicating the normal reproducing mode, the process is returned to Step S3-1.

At Step S4, the focus bias value is fixed, and the application of the sine wave drive signal to the second electromagnetic actuator 15 is stopped, to stop the movement of the second objective lens 14, thus starting recording.

In this embodiment, the present invention is applied to the optical system using the two-group objective lens with the high numerical aperture in which the distance between the lenses of the two-group objective lens is variable; however, the present invention can be similarly applied to an optical system using a two-group objective lens with a high numerical aperture in which the distance between lenses of the two-group objective lens is fixed, or an optical system using a single objective lens with a high numerical aperture.

Figure 8:
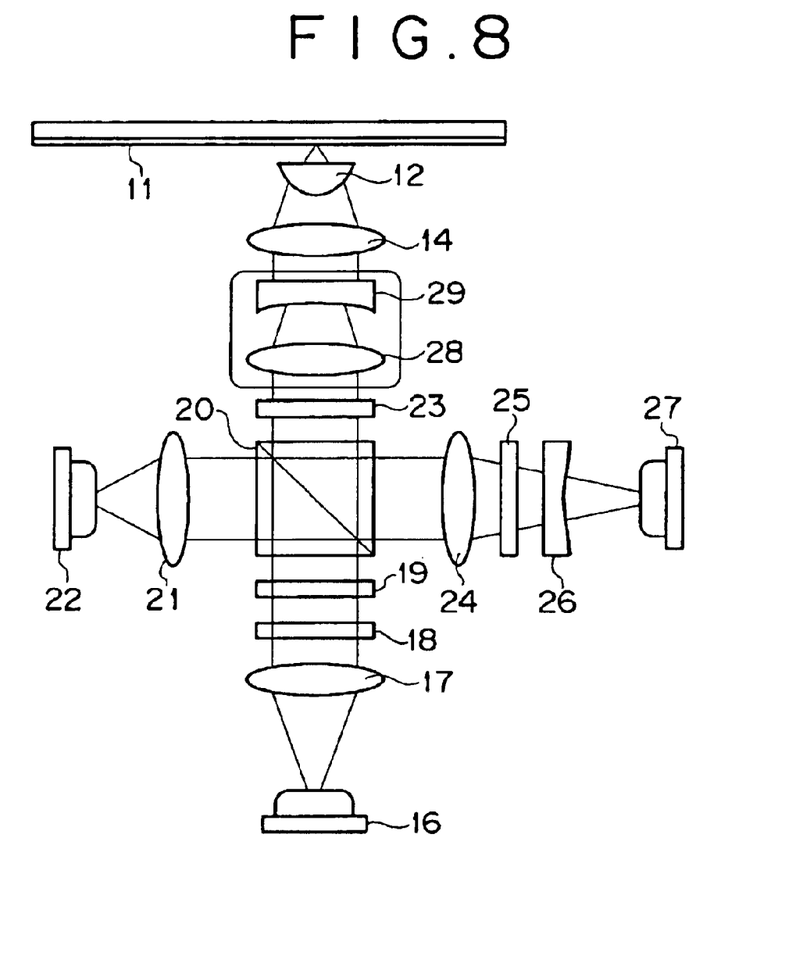
FIG. 8 is a diagram showing a configuration of an optical pickup of a type in which the distance of lenses of a two-group objective lens is fixed according to an embodiment of the present invention.

FIG. 8 shows a configuration of an optical pickup using a two-group objective lens in which the distance between lenses of the two-group objective lens is fixed according to an embodiment of the present invention.

The optical pickup adopts an optical system shown in FIG. 8 in which relay lenses 28 and 29 for correcting spherical aberration are inserted between the quarter-wave plate 23 and the second lens 14 shown in FIG. 2. Upon focusing operation, like the above-described manner, after start-up of focus control, the first and second lenses 12 and 14 are integrally moved by the first electromagnetic actuator and the relay lens 29 or 28 for correcting spherical aberration is moved by the second electromagnetic actuator such that the amplitude of a reproducing RF signal is maximized, to thereby optimize the distance between the relay lenses and simultaneously adjust an offset between a focal point of a light beam and a signal recording plane of a recording medium. The first and second objective lenses may be integrated into a one objective lens.

In this embodiment, the amplitude of a signal from embossed pit portions previously, discretely formed on a recording medium is used for optimization of the distance between the lenses of the two-group objective lens and the offset in focus control; however, the information, not amplitude of a signal but such as a jitter value of a reproducing signal, can be used as an error signal.

Upon start-up of the optical disk drive, the positional adjustment of the lenses of the two-group objective lens may be performed by making use of a continuous signal portion such as a lead-in portion provided at the innermost peripheral portion of an optical disk. In this case, the moving frequencies of the lenses can be suitably set in a range satisfying the relationship of f1<<f2.

In the case of an already recorded optical medium, an error signal can be obtained by reproducing a recorded signal. To be more specific, upon insertion of the optical disk, the optimization may be carried out at a high speed by reproducing a continuous pit signal at the innermost peripheral portion with the frequencies f1 and f2 increased up to, for example, 100 Hz and 2 kHz, respectively. At this time, by setting the amplitude of the cyclic movement of the lens at a large value, it is possible to obtain an error signal with a high S/N ratio. After that, by making the movement amount quite small for each reproducing track using the method described in this embodiment, the distance between lenses of the two-group objective lens and the offset in focus control are always, automatically allowed to follow a change with an elapsed time, a change in environmental temperature, and the like.

In this embodiment, although description has been made by example of the optical disk and optical disk drive of the CAV format, the present invention can be applied to an optical disk and an optical disk drive of another format, such as a CLV (Constant Linear Velocity) or ZCLV (Zone CLV) format. In addition, upon extraction of information of a change in amplitude from a reproducing signal, in order to obtain accurate information, as described in this embodiment, it is desirable to detect an error signal in the state in which not only focus servo but also tracking servo is activated.

As described above, to realize a large capacity recordable optical disk drive using a two-group objective lens with a high numerical aperture, it is required to optimize the distance between lenses of the two-group objective lens for minimizing occurrence of spherical aberration due to the distance between the lenses of the two-group objective lens, and also it becomes important to optimize the offset in focus control for making the most of a focal depth which is essentially smaller than that of a related art optical disk drive.

According to the apparatus and method in this embodiment, it is possible to simultaneously optimize the distance between lenses of a two-group objective lens and the offset in focus control. Also in a recordable optical disk such as a DVD-RAM and an optical disk drive, the position of each lens can be previously optimized in an unrecorded state.

The optical information recording/reproducing apparatus in this embodiment includes an optical pickup for making a light beam emitted from a light source incident on an optical disk 11 via a two-group objective lens so as to record or reproduce optical information on or from the optical disk 11, wherein the two-group objective lens includes a first lens 12 disposed in the vicinity of the optical disk and a second lens 14 disposed at a position facing to the optical disk 11 with the first lens 12 put therebetween. The apparatus further includes a first electromagnetic actuator 13 and a second electromagnetic actuator 15 as a moving means for cyclically moving at least one of the first lens 12 and the second lens 14 constituting part of the optical pickup in the direction of the optical axis thereof; and a position control circuit 42 as a control means for performing, upon focusing operation, the positional adjustment of the first lens 12 and the second lens 14 after start-up of focus control, on the basis of reproducing signals obtained from optical disk 11 at both ends of the cyclic movement of the at least one of the first lens 12 and the second lens 14 by the first and second electromagnetic actuators 13 and 15 as the moving means. Accordingly, it is possible to simultaneously optimize the distance between the first lens 12 and the second lens 14 constituting the two-group objective lens and an offset in focus control, and hence to record or reproduce optical information data in the best focus control state.

In the optical information recording/reproducing apparatus in this embodiment, since a cycle of the cyclic movement of the at least one of the first lens 12 and the second lens 14 by the moving means configured as the first and second electromagnetic actuators 13 and 15 is synchronized with an appearance cycle of pit signal portions 51 which are previously, discretely formed on the optical disk 11, it is possible to optimize the distance between the lenses of the two-group objective lens and an offset in focus control using the appearance cycle of the embossed pit portions previously, discretely formed on the optical disk 11 as the recording medium.

In the optical information recording/reproducing apparatus in this embodiment, the positional adjustment of the first lens 12 and the second lens 14 is based on an amplitude of a reproducing signal detected by the optical pickup. When the distance between the lenses of the two-group objective lens and the offset in focus control are optimized, the displacement of the focal point centered on a signal recording plane becomes zero, so that the amplitude of the signal is maximized. Further, the amplitude of the signal is minimized at a point where the objective lens becomes closest to the recording medium and at a point where the objective lens becomes remotest from the recording medium and accordingly, it is decided that the distance between the lenses of the two-group objective lens and the offset in focus control are deviated from the optimum values if the amplitudes at both the ends of the cyclic movement of the objective lens. As a result, it is possible to optimize the distance between the lenses of the two-group objective lens and the offset in focus control by adjusting them such that the amplitudes at the both ends of the above cyclic movement are equal to each other.

In the optical information recording/reproducing apparatus in this embodiment, of the amplitude of a reproducing signal detected by the optical pickup, an amplitude component having passed through a low band filer is used for detection of a variation in amplitude accompanied by a change in the distance between the first lens 12 and the second lens 14. Accordingly, even if defocus generated simultaneously with generation of spherical aberration due to a change in the distance between the lenses is larger than a variation in amplitude due to the spherical aberration and such defocus cannot be canceled by focus control, it is possible to prevent the reproducing signal from being largely affected by a variation in amplitude due to defocus by cyclically changing the distance between the lenses of the two-group objective lens at a low frequency for separating a band of variation in amplitude due to spherical aberration from a band of variation in amplitude due to defocus, and hence to simultaneously optimize the focus offset and the distance between the lenses of the two-group objective lens.

In the optical information recording/reproducing apparatus in this embodiment, of the amplitude of a reproducing signal detected by the optical pickup, an amplitude component having passed through a high band filer is used for detection of a variation in amplitude resulting from an offset in focus control. Accordingly, in the case of recording or reproducing optical information on or from a high density optical recording medium, it is possible to simultaneously optimize the focus offset and the distance between the lenses of the two-group objective lens by separating a band of variation in amplitude due to spherical aberration from a band of variation in amplitude due to defocus.

The optical information recording/reproducing method in this embodiment uses an optical pickup for making a light beam emitted from a light source incident on an optical disk 11 via a two-group objective lens so as to record or reproduce optical information on or from the optical disk 11, wherein the two-group objective lens includes a first lens 12 disposed in the vicinity of the optical disk 11 and a second lens 14 disposed at a position facing to the optical disk 11 with the first lens 12 put therebetween. The method includes the steps of cyclically moving at least one of the first lens 12 and the second lens 14 constituting part of the optical pickup in the direction of the optical axis thereof; and performing, upon focusing operation, the positional adjustment of the first lens 12 and the second lens 14 after start-up of focus control, on the basis of reproducing signals obtained from optical disk 11 at both ends of the cyclic movement of the at least one of the first lens 12 and the second lens 14. Accordingly, it is possible to simultaneously optimize the distance between the first lens 12 and the second lens 14 constituting the two-group objective lens and an offset in focus control, and hence to record or reproduce optical information data at a high speed in the best focus control state.

In the optical information recording/reproducing method in this embodiment, since a cycle of the cyclic movement of the at least one of the first lens 12 and the second lens 14 is synchronized with an appearance cycle of pit signal portions 51 which are previously, discretely formed on the optical disk 11, it is possible to simply optimize the distance between the lenses of the two-group objective lens and an offset in focus control at a high speed using the appearance cycle of the embossed pit portions previously, discretely formed on the optical disk 11 as the recording medium.

In the optical information recording/reproducing method in this embodiment, the positional adjustment of the first lens 12 and the second lens 14 is based on an amplitude of a reproducing signal detected by the optical pickup. When the distance between the lenses of the two-group objective lens and the offset in focus control are optimized, the displacement of the focal point centered on a signal recording plane becomes zero, so that the amplitude of the signal is maximized. Further, the amplitude of the signal is minimized at a point where the objective lens becomes closest to the recording medium and at a point where the objective lens becomes remotest from the recording medium and accordingly, it is detected that the distance between the lenses of the two-group objective lens and the offset in focus control are deviated from the optimum values if the amplitudes at the both ends of the cyclic movement of the objective lens. As a result, it is possible to simply optimize the distance between the lenses of the two-group objective lens and the offset in focus control at a high speed by adjusting them such that the amplitudes at the both ends of the above cyclic movement are equal to each other.

In the optical information recording/reproducing method in this embodiment, of the amplitude of a reproducing signal detected by the optical pickup, an amplitude component having passed through a low band filer is used for detection of a variation in amplitude accompanied by a change in the distance between the first lens 12 and the second lens 14. Accordingly, even if defocus generated simultaneously with generation of spherical aberration due to a change in the distance between the lenses is larger than a variation in amplitude due to the spherical aberration and such defocus cannot be canceled by focus control, it is possible to prevent the reproducing signal from being largely affected by a variation in amplitude due to defocus by cyclically changing the distance between the lenses of the two-group objective lens at a low frequency for separating a band of variation in amplitude due to spherical aberration from a band of variation in amplitude due to defocus, and hence to simultaneously optimize the focus offset and the distance between the lenses of the two-group objective lens at a high speed.

In the optical information recording/reproducing method in this embodiment, of the amplitude of a reproducing signal detected by the optical pickup, an amplitude component having passed through a high band filer is used for detection of a variation in amplitude resulting from an offset in focus control. Accordingly, in the case of recording or reproducing optical information on or from a high density optical recording medium, it is possible to simultaneously optimize the focus offset and the distance between the lenses of the two-group objective lens at a high speed by separating a band of variation in amplitude due to spherical aberration due to a change in distance between the lenses of the two-group objective lens from a band of variation in amplitude due to defocus.

In this embodiment, the optical disk 1 is configured as a DVD-RAM; however, it may be configured as other optical disks such as a mini-disk (MD), a rewritable type CD-ROM, and a magneto-optic disk (MO).

While the preferred embodiments of the present invention have been described using the specific terms, such description is for illustrative purposes only, and it is to be understood that changes and variations may be made without departing from the spirit or scope of the following claims.

What is claimed is:

1. An optical information recording/reproducing apparatus comprising:

an optical pickup means for making a light beam emitted from a light source incident on a recording medium via a two-group objective lens so as to record or reproduce optical information on or from said recording medium, said two-group objective lens including a first lens disposed at a first position facing said recording medium and a second lens disposed a preset distance from the first position also facing said recording medium at a second position further from the recording medium than said first position, said first and second lenses having a common optical axis therebetween;

a reproducing signal detecting means for providing reproducing signals from light received from the recording medium after passage through the pickup means;

a moving means for repeatedly moving at least one of said first lens and said second lens back and forth between two end positions along the common optical axis respectively nearer to and farther from the record medium, with each movement between the two end positions occurring over corresponding equal periods of time; and a control means for performing, upon a focusing operation after start up of focus control, a positional adjustment of said at least one of said first lens and said second lens to adjust the distance there between on the basis of changes in the reproducing signals obtained at one or more positions of said at least one of said first lens and said second lens during the repeated movement thereof by said moving means.

2. An optical information recording/reproducing apparatus according to claim 1, further comprising means for synchronizing the repeated movement of said at least one of said first lens and said second lens by said moving means with signal portions in the reproducing signal caused by pits discretely formed on said recording medium.

3. An optical information recording/reproducing apparatus according to claim 1, wherein the changes in the reproducing signals are changes in an envelope component thereof.

4. An optical information recording/reproducing apparatus according to claim 3, further comprising a low band filter receiving the reproducing signals and providing the envelope component to the control means.

5. An optical information recording/reproducing apparatus according to claim 3, wherein further comprising a high band filter receiving the reproducing signals and providing the envelope component to the control means.

6. An optical information recording/reproducing apparatus according to claim 1, wherein said one or more positions are two positions corresponding to said two end positions.

7. An optical information recording/reproducing apparatus including an optical pickup for making a light beam emitted from a light source incident on a recording medium via a two-group objective lens and at least a third lens so as to record or reproduce optical information on or from said recording medium, said two-group objective lens including a first lens disposed in the vicinity of said recording medium and a second lens disposed at a position facing to said recording medium with said first lens put therebetween and being configured such that a distance between said first lens and said second lens is fixed, said apparatus comprising:

a first drive means for integrally driving said first lens and said second lens in the direction of the optical axis thereof, and a second drive means for driving said third lens in the direction of the optical axis thereof;

a moving means for moving at least one of said first and second lenses and said third lens constituting part of said optical pickup in the direction of the optical axis thereof; and a control means for performing, upon focusing operation, the positional adjustment of said first and second lenses and said third lens after start-up of focus control, on the basis of reproducing signals obtained from said recording medium at one or more points of the movement of said at least one of said first and second lenses and said third lens by said moving means.

8. An optical information recording/reproducing apparatus according to claim 7, wherein the movement of said at least one of said first and second lenses and said third lens by said moving means is synchronized with an appearance cycle of pit signal portions which are previously, discretely formed on said recording medium.

9. An optical information recording/reproducing apparatus according to claim 7, wherein the positional adjustment of said first and second lenses and said third lens is based on an envelope component of a reproducing signal detected by said optical pickup.

10. An optical information recording/reproducing apparatus according to claim 7, wherein the movement of said third lens is longer than the movement of said first and second lenses.

11. An optical information recording/reproducing apparatus according to claim 7, wherein said control means performs, upon focusing operation, the positional adjustment of said first and second lenses after start-up of focus control, on the basis of reproducing signals obtained from said recording medium at both ends of the cyclic movement of said first and second lenses by said moving means.

12. An optical information recording/reproducing apparatus according to claim 7, wherein of an envelope component of a reproducing signal detected by said optical pickup, a signal component having passed through a low band filer is used for detection of a variation in amplitude accompanied by the movement of said third lens.

13. An optical information recording/reproducing apparatus according to claim 7, wherein of an envelope component of a reproducing signal detected by said optical pickup, a signal component having passed through a high band filer is used for detection of a variation in amplitude resulting from an offset in focus control.

14. An optical information recording/reproducing apparatus comprising:

an optical pickup configured to record or reproduce optical information on or from a recording medium using a light beam emitted from a light source, the optical pickup including a primary lens disposed nearer to said recording medium than a secondary lens of the optical pickup, the primary and secondary lenses having a common optical axis;

a detector configured to provide reproducing signals from light received from said recording medium via the optical pickup;

a drive signal source configured to output a primary drive signal of a primary frequency and a secondary drive signal of a secondary frequency, said secondary frequency being of higher frequency than said primary frequency;

a first drive actuator configured to be responsive to the primary drive signal to repeatedly move said primary lens in opposite directions along a direction of the common optical axis between two primary end Positions respectively closer to and further from the recording medium;

a second drive actuator configured to be responsive to the secondary drive signal to repeatedly move said secondary lens in opposite directions along a direction of the common optical axis between two opposite secondary end positions respectively closer to and further from the recording medium; and control circuitry configured to control a positional adjustment of at least one of said primary lens and said secondary lens position during a focusing operation occurring after start-up of focus control on the basis of changes in the reproducing signals obtained at one or more positions of said at least one of said primary lens and said secondary lens during the movement thereof along the common optical axis by a corresponding drive actuator.

15. An optical information recording/reproducing apparatus according to claim 14, further comprising means for synchronizing the repeated movement of said primary lens and said secondary lens along the common optical axis by a corresponding drive actuator with signal portions in the reproducing signal caused by pits discretely formed on said recording medium.

16. An optical information recording/reproducing apparatus according to claim 14, wherein the changes in the reproducing signals are changes in an envelope component thereof.

17. An optical information recording/reproducing apparatus according to claim 16, further comprising a low band filter receiving the reproducing signals and providing the envelope component to the control circuitry.

18. An optical information recording/reproducing apparatus according to claim 16, further comprising a high band filter receiving the reproducing signals and providing the envelope component to the control circuitry.

19. An optical information recording/reproducing apparatus according to claim 14, wherein said one or more positions are two positions corresponding to at least one pair of said opposite primary and secondary end positions.

20. An optical information recording/reproducing method which is carried out by using an optical pickup for making a light beam emitted from a light source incident on a recording medium via a two-group objective lens so as to record or reproduce optical information on or from said recording medium, said two-group objective lens including a first lens disposed at a first position facing said recording medium and a second lens disposed a preset distance from the first position facing said recording medium at a second position further from the recording medium than said first position, said first and second lenses having a common optical axis therebetween said method comprising the steps of:

receiving light from the recording medium at a reproducing signal detector after light passage through the optical pickup and providing a reproducing signal from the reproducing signal detector;

repeatedly moving at least one of said first lens and said second lens back and forth between two end positions along the common optical axis respectively nearer to and farther from the record medium, with each movement between the two end positions occurring over corresponding equal periods of time; and performing, upon a focusing operation after start un of focus control, a positional adjustment of said at least one of said first lens and said second lens to adjust the distance there between on the basis of changes in the reproducing signals obtained at one or more positions of said at least one of said first lens and said second lens during the repeatedly moving step.

21. An optical information recording/reproducing method according to claim 20, further comprising a step of synchronizing the repeated movement of said at least one of said first lens and said second lens with signal portions in the reproducing signal caused pits discretely formed on said recording medium.

22. An optical information recording/reproducing method according to claim 20, wherein the changes in the reproducing signals are chances in an envelope component thereof.

23. An optical information recording/reproducing method according to claim 22, further comprising passing the received reproducing signals through a low band filter so as to provide the envelope component.

24. An optical information recording/reproducing method according to claim 22, further comprising passing the received reproducing signals through a high band filter so as to provide the envelope component.

25. An optical information recording/reproducing method according to claim 20, wherein said:

one or more positions are two positions corresponding to said two end positions.

\* \* \* \* \*

UNITED STATES PATENT AND TRADEMARK OFFICE
CERTIFICATE OF CORRECTION

PATENT NO. : 6,826,133 B2
DATED : November 30, 2004
INVENTOR(S) : Isao Ichimura et al.

It is certified that error appears in the above-identified patent and that said Letters Patent is hereby corrected as shown below:

Column 17,
Line 32, please insert -- also -- after "the first position".

Column 18,
Line 9, please change "un" to -- up --.
Line 20, please insert -- by -- after "reproducing signal caused".

Signed and Sealed this

Fourteenth Day of June, 2005

JON W. DUDAS
*Director of the United States Patent and Trademark Office*